US010509411B2

(12) United States Patent
Bevot

(10) Patent No.: US 10,509,411 B2
(45) Date of Patent: Dec. 17, 2019

(54) METHOD AND SYSTEM FOR OPERATING A VEHICLE

(71) Applicant: Robert Bosch GmbH, Stuttgart (DE)

(72) Inventor: Claudius Bevot, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 126 days.

(21) Appl. No.: 15/665,555

(22) Filed: Aug. 1, 2017

(65) Prior Publication Data
US 2018/0059675 A1 Mar. 1, 2018

(30) Foreign Application Priority Data

Sep. 1, 2016 (DE) ........................ 10 2016 216 520

(51) Int. Cl.
G05D 1/02 (2006.01)
G05D 1/00 (2006.01)
B60W 50/08 (2012.01)

(52) U.S. Cl.
CPC ......... G05D 1/0229 (2013.01); B60W 50/082 (2013.01); G05D 1/0088 (2013.01); G05D 1/0255 (2013.01); G05D 1/0274 (2013.01); B60W 2540/04 (2013.01); B60W 2550/40 (2013.01); B60W 2750/40 (2013.01); G05D 1/0061 (2013.01); G05D 2201/0213 (2013.01)

(58) Field of Classification Search
CPC .. G05D 1/0088; G05D 1/0229; G05D 1/0255; G05D 1/0274; G05D 1/0061; G05D 2201/0213; B60W 50/082; B60W 2750/40; B60W 2540/04; B60W 2550/40
See application file for complete search history.

(56) References Cited

U.S. PATENT DOCUMENTS

| 8,457,827 | B1 * | 6/2013 | Ferguson | G05D 1/00 701/23 |
|---|---|---|---|---|
| 9,079,587 | B1 * | 7/2015 | Rupp | G05D 1/0289 |
| 9,767,369 | B2 * | 9/2017 | Furman | G06K 9/00805 |
| 9,779,314 | B1 * | 10/2017 | Wendel | G06K 9/00825 |
| 9,857,798 | B2 * | 1/2018 | Ogale | G06K 9/00791 |
| 10,157,423 | B1 * | 12/2018 | Fields | G07C 5/0808 |
| 10,168,423 | B2 * | 1/2019 | Lombrozo | G01S 7/4813 |
| 10,241,508 | B2 * | 3/2019 | Fairfield | G05D 1/0044 |
| 2006/0089764 | A1 * | 4/2006 | Filippov | G05D 1/027 701/23 |
| 2006/0089765 | A1 * | 4/2006 | Pack | G05D 1/0061 701/23 |
| 2006/0089766 | A1 * | 4/2006 | Allard | G05D 1/0061 701/23 |
| 2006/0089800 | A1 * | 4/2006 | Svendsen | G05D 1/027 701/301 |

(Continued)

Primary Examiner — Mussa A Shaawat
(74) Attorney, Agent, or Firm — Norton Rose Fulbright US LLP; Gerard Messina

(57) ABSTRACT

A method and a system for operating a vehicle. The vehicle has a predefined at least partially autonomous control mode and is designed to provide an identification indicating the predefined control mode to a vehicle-related component that has information relevant for the predefined control mode and/or one or more control command(s) relevant for the predefined control mode. To make the information and/or the control commands available to the vehicle, the providing takes place only when the vehicle is in the predefined control mode.

13 Claims, 2 Drawing Sheets

(56) References Cited

U.S. PATENT DOCUMENTS

| | | | |
|---|---|---|---|
| 2012/0174525 A1* | 7/2012 | Hinshaw | B25F 5/00 52/741.1 |
| 2013/0325241 A1* | 12/2013 | Lombrozo | B60W 40/00 701/23 |
| 2015/0006005 A1 | 1/2015 | Yu et al. | |
| 2015/0149017 A1* | 5/2015 | Attard | B60W 30/182 701/23 |
| 2015/0259007 A1* | 9/2015 | Di Cairano | B62D 15/025 701/41 |
| 2015/0336502 A1* | 11/2015 | Hillis | B60Q 1/26 701/23 |
| 2016/0358475 A1* | 12/2016 | Prokhorov | G05D 1/0011 |
| 2017/0036678 A1* | 2/2017 | Takamatsu | B60W 10/04 |
| 2017/0102700 A1* | 4/2017 | Kozak | B60W 30/00 |
| 2017/0174215 A1* | 6/2017 | Tseng | B60W 10/20 |
| 2017/0320495 A1* | 11/2017 | Lu | B60W 10/06 |
| 2017/0334459 A1* | 11/2017 | McNew | B60W 50/14 |
| 2018/0324823 A1* | 11/2018 | Martin | H04W 72/042 |

\* cited by examiner

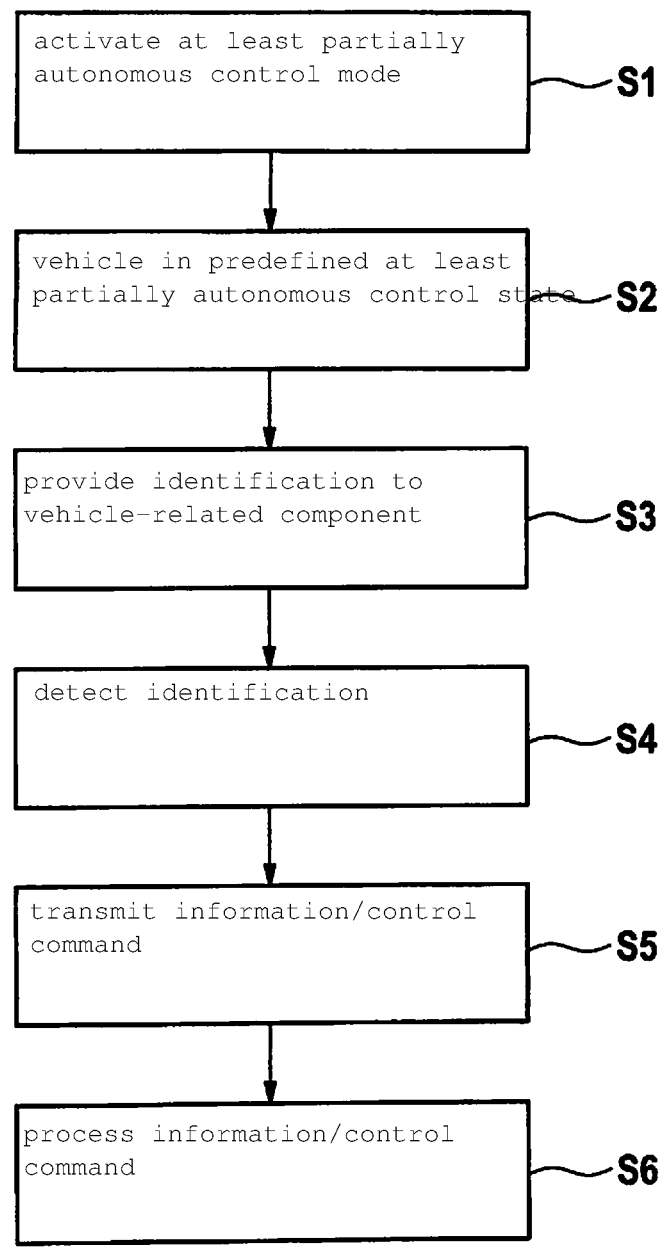

METHOD AND SYSTEM FOR OPERATING A VEHICLE

CROSS REFERENCE

The present application claims the benefit under 35 U.S.C. § 119 of German Patent Application No. DE 102016216520.8 filed on Sep. 1, 2016, which is expressly incorporated herein by reference in its entirety.

FIELD

The present invention relates to a method and system for operating a vehicle. In particular, the present invention relates to a method and a system for operating a vehicle that has a predefined and at least partially autonomous control mode.

BACKGROUND INFORMATION

Examples of autonomous control modes for vehicles range from driver assistance systems, in which predefined control tasks such as a distance control or a speed control need no longer be carried out by the driver alone, to control modes of autonomously driving vehicles, in which the vehicle autonomously assumes the complete control over the vehicle actions without involving a driver. In this context, the different developments of autonomous driving can be subdivided into different stages of assistance, such as a partial automation, a high automation, or a full automation.

The development of autonomous driving modes or control modes goes hand in hand with an increase in demands on the vehicle communication and with an ongoing further development of the safety of the autonomous modes. For example, in driver-assistance systems it is already often necessary for the vehicle to receive information or control commands from communications partners in the environment or from remote servers, such as information relating to a speed limit in a local road segment, for example. It is also desirable, especially in the interest of safety, that an autonomous vehicle be perceived as such by its environment.

U.S. Patent Appl. Pub. US 2015/0006005 A1 describes an autonomous, driverless vehicle that can be used for deliveries and that has a multitude of compartments for freight pieces. The vehicle includes a control system for autonomous driving and an environment-sensor system, and is furthermore equipped with a flashing-light signal lamp in order to increase the recognizability of the vehicle.

SUMMARY

The present invention relates to a method and a system for operating a vehicle and a corresponding vehicle.

Preferred developments of the present invention are described herein.

According to an aspect of the present invention, a method for operating a vehicle is provided, the vehicle having a predefined, at least partially autonomous control mode. The vehicle is designed to provide an identification indicating the predefined control mode to a vehicle-related component that holds information and/or control commands relevant for the predefined control mode. The providing in order to make the information/control commands of the vehicle-related component available to the vehicle takes place only when the vehicle is in the predefined control mode.

This reliably ensures that a vehicle that is currently operated in an at least partially autonomous control mode is also recognized as such, in particular by machines and other devices. Furthermore, this enables the vehicle to use relevant information or control commands made available by any vehicle-related component.

In particular, any suitable machine or any suitable device or any machine-to-machine interface that benefits from or requires a particular behavior, and a behavior specially adapted for the existing at least partially autonomous control mode, may advantageously be considered as vehicle-related component.

Through the aspects of the present invention, an identification of the control mode vis-à-vis the vehicle-related component is advantageously able to take place in order to activate the use of special behaviors or in order to transmit special control commands/information that differ(s) from the corresponding data that are transmitted in a non-autonomous control mode or driving mode.

In particular, a typical control mode of a vehicle that is not under the full and exclusive control of the human driver in terms of the method is considered an at least partially autonomous control mode in connection with the aspects of the present invention.

Furthermore, the relevant information or control commands of the vehicle-related component are basically not restricted to a particular type of data. Instead, any type of information provided by a vehicle-related component and required for the individual operating mode of the vehicle may be taken into account, and also each control command that is tailored to the at least partially autonomous operating mode.

As a whole, thanks to the aspects of the present invention, an exchange of data suitable for the at least partially autonomous operating state is thus possible. It can therefore be ensured that all measures and controls are available in the at least partially autonomous operating mode and that any information that is helpful in the operation in the operating mode is able to be accessed, which further increases the safety and efficiency of the vehicle control.

According to a preferred specific embodiment, the identification is provided to a multitude of vehicle-related components.

In addition, the identification may be carried out automatically and also only when the vehicle is in the predefined, at least partially autonomous control mode.

In this way the behavior between the vehicle and the environment is able to be coordinated in an optimal manner, which further increases the safety, in particular. In addition, the feasibility of the at least partially autonomous control mode is facilitated.

The vehicle-related component may be made up of a single machine or a single device.

However, the vehicle-related component may also encompass a plurality of components, in particular a plurality of interconnected machines or devices. The different components or subcomponents of the vehicle-related component may also be located at a distance from one another. For example, a first subcomponent of the vehicle-related component, in particular a communications means, may be located in the vicinity of the vehicle environment, and a second subcomponent may be situated at a distance from the vehicle, e.g., in a central computer.

According to a specific embodiment, the vehicle-related component includes a device situated outside the vehicle, such as a traffic-infrastructure component or another vehicle, particularly one that is driving autonomously.

According to a specific embodiment, in response to a detection of the identification, i.e., when the at least partially autonomous control mode or the vehicle operated in the partially autonomous control mode has been detected, the vehicle-related component is able to report or forward the identification or the information about the detection of the mode to a unit that is superposed to the vehicle-related component. The superposed unit or the vehicle-related component may be equipped with a central control unit in such a case.

The vehicle-related component may also be at least partially implemented on a local server that could be located in the environment of the vehicle. For example, this may pertain to a traffic-infrastructure component installed at a certain intersection at which the vehicle is located just then.

The vehicle-related component may also be implemented on a server system that is remote from the vehicle.

The development of the vehicle-related component is not restricted to a particular type of object, machine, product or device; instead the development may be guided by the stipulation that it be taken into account with regard to the at least partially autonomous control mode of the vehicle.

According to a special embodiment, the vehicle-related component may also encompass a parking building or an intelligent building.

Additional examples of vehicle-related components also encompass, among other things, traffic-monitoring devices including speed-control cameras, traffic-flow measuring systems etc. as well as traffic-guidance systems, display panels etc.

The vehicle-related component is also not exclusively limited to hardware components but may also be realized with the aid of memory contents and/or with the aid of predefined computer-implemented control methods.

According to a preferred specific embodiment of the present invention, the vehicle-related component has an on-board or vehicle-internal device, so that an interface to internal devices is able to be made available. Pertinent examples may be a navigation device, a drive recorder, entertainment media, a telephone, etc.

In particular, this makes it possible to advantageously carry out a data exchange between the at least partially autonomously operated vehicle and a vehicle service, such as with regard to a status of the battery in the case of electric drives.

Furthermore, if the identification is provided to an interface to internal devices, this may advantageously also contribute to providing answers in case of legal questions, i.e. with regard to the control state in which the vehicle had been at the time of an accident. This can be achieved in a particularly reliable manner in specific embodiments that provide the identification automatically, e.g., on a drive recorder.

According to a specific embodiment, the identification is also able to be forwarded via the Internet; this information may be loaded onto a Cloud and used there further, such as for traffic guidance systems, navigation devices, car sharing, etc.

According to a special embodiment of the present invention, in response to the supply of the identification by the vehicle, the relevant information and/or the relevant control commands is/are processed by the vehicle-related component, no transmission of the relevant information/control commands to the vehicle having to take place according to a variant of the specific embodiment. For example, this is the case if the vehicle-related component, when executing a relevant control command, merely switches a technical function or an exploitability of a device on or off as a function of the currently selected or the currently existing operating state of the vehicle. It is possible, for instance, that in a vehicle-related component which includes an entertainment medium such as a TV function or a movie playback function, the TV function or the movie playback function is enabled only for the vehicle passengers in an autonomous driving state. In other words, the information of the vehicle-related component here states that the playback function is to be blocked. Put another way, according to an aspect of this variant of an embodiment, the relevant control command controls to blocking of the playback function.

According to another preferred embodiment of the present invention, an item of information relevant for the control mode is transmitted by the vehicle-related component to the vehicle in response to the receipt of the identification. For instance, this may be the case when an information exchange or a transmission of information from an intelligent traffic sign to the vehicle takes place, the information, especially a speed limit indication, being displayed not only optically in the form of a number for human road users, but also in the form of data that the vehicle is able to read.

According to another specific embodiment, a control command is transmitted to the vehicle additionally or alternatively, which advantageously results in the option of shifting a vehicle control at least partially to a higher-level unit such as a technical infrastructure of a parking building.

The providing of the identification may take place in that the vehicle transmits the identification to the respective vehicle-related component. However, the present invention is not restricted to such an embodiment. Alternatively or additionally, it is also possible that the identification is read out by the vehicle-related component via a communications channel. To do so, the associated connection establishment may also be initiated by the vehicle-related component. According to a preferred procedure, however, the identification is transmitted by the vehicle.

In addition, according to a specific embodiment, in which the relevant information and/or the relevant control command is/are sent to the vehicle, the earlier providing of the identification that had triggered the transmission may take place using the same communications means/communication channel or using some other communication means/communication channel.

The data transmission and the communication between the vehicle and the vehicle-related component are not restricted to a particular development of a data exchange.

Instead, specific embodiments of the present invention are based on the special characteristic that the identification is provided in machine-readable form, i.e. in an unambiguous manner, so that in a case in which the predefined at least partially autonomous vehicle control mode is present, each one of the relevant vehicle-related components obtains knowledge of the control mode.

For example, the vehicle may have a driver assistance system such as a parking aid, and an associated control mode. According to such a specific embodiment, the use of the parking aid is thus viewed as the existence of the predefined at least partially autonomous control mode. According to a specific embodiment, it is possible that the vehicle transmits an identification in order to identify and provide knowledge of the mode to a parking building, whereupon the parking building sends information pertaining to the facilities.

According to a further specific embodiment, the vehicle drives in a fully automated or in an at least partially automated manner in the predefined control mode. Given this higher stage of autonomy, which is likewise able to be indicated with the aid of the identification, the parking building is also able to transmit control commands for intervening in the parking operation According to a preferred specific embodiment of the present invention, depending on the current control mode, the vehicle provides a correspondingly different current identification.

According to an advantageous specific embodiment, each vehicle that has comparable control modes and in which the method is executed provides the same standardized set of identifications.

Furthermore, a vehicle-related component may hold a separate special and relevant item of information and/or a control command in readiness for each of the at least partially autonomous control modes; these are made available to the vehicle or activated for the vehicle in response to the providing/communication of the respective identification.

According to a specific embodiment of the present invention, when the vehicle is no longer in the predefined control mode, a corresponding deactivation identification is supplied to the vehicle-related component.

The transmission or providing of the identification may be carried out electrically, optically and/or acoustically, e.g., via radio, infrared or ultrasound.

According to a preferred specific embodiment, the transmission or the providing of the identification takes place electrically, for which a wireless or a wired transmission is possible. With regard to a vehicle-related component outside the vehicle, the identification may be made available in a wireless manner; with regard to a vehicle-related component in the vehicle interior, it may be provided in a wireless or a wired manner.

According to a preferred specific embodiment, the transmission of the identification as an item of information regarding a status of the autonomous driving is carried out in a normalized and standardized manner, e.g., using WLAN, Bluetooth, near-field communication and/or IPv4/6.

According to an aspect of the present invention, an associated system for operating a vehicle is additionally provided.

According to a further aspect of the present invention, a corresponding vehicle, which is set up for executing the afore-described method, is also provided.

BRIEF DESCRIPTION OF THE DRAWINGS

Preferred specific embodiments of the present invention are discussed in greater detail below with the aid of the figures.

FIG. 2 shows a method for operating a vehicle, according to a specific embodiment of the present invention.

DETAILED DESCRIPTION OF EXAMPLE EMBODIMENTS

Figure 1:
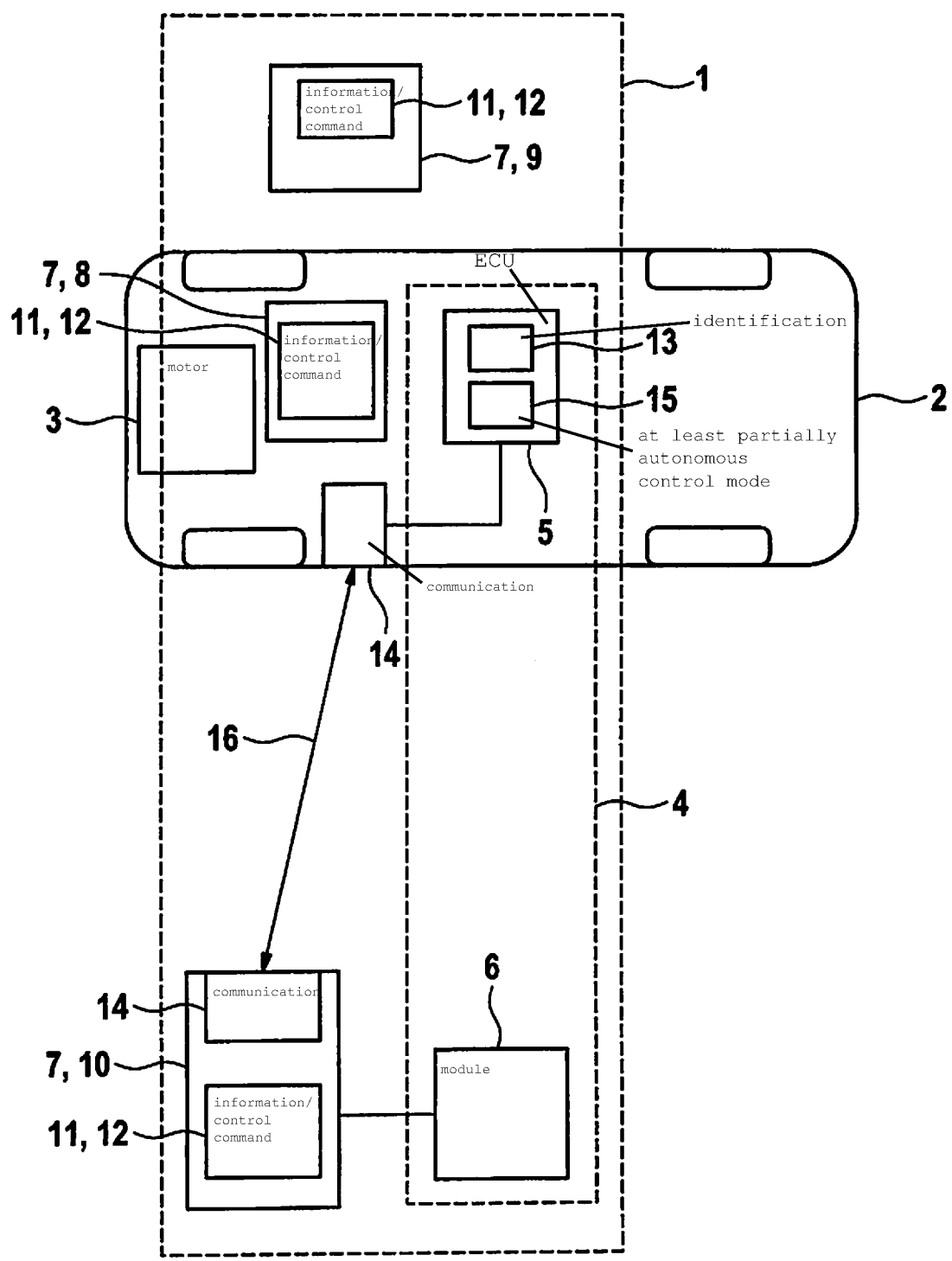
FIG. 1 shows a schematic block diagram of a system for operating a vehicle, according to a specific embodiment of the present invention.

FIG. 1 shows a schematic block diagram of a system 1 for operating a vehicle 2 according to a specific embodiment of the present invention. According to the specific embodiment illustrated here, vehicle 2 is a passenger car, for which a heavily stylized outline including four sketched wheels is shown in the drawing in a plan view. The passenger car here serves as a preferred example, but the present invention is not restricted to such a development. For instance, vehicle 2 may also be a truck or a construction vehicle according to a specific embodiment, or a vehicle without passengers. The drawing furthermore shows a drive motor 3 of vehicle 2.

System 1 is employed to allow or optimize the operation of vehicle 2 in an at least partially autonomous control mode 15. In particular, this control mode 15 is a drive mode in which vehicle 2 is not subject to the exclusive and complete control of the driver, but in which at least sub-tasks of the vehicle control are able to be transferred to system 1. In a fully automated version, this may be an autonomously driving vehicle that requires no driver. However, in many cases only a partial automation or an assistance system is used, such as a Tempomat or a lane-keeping control. Illustrated system 1 includes the modules of vehicle 2 that pertain to the implementation of the at least partially autonomous control mode 15. To indicate this, motor 3 is shown partially outside dashed box 1 in FIG. 1, inasmuch as motor 3 is primarily used for the drive.

As shown in FIG. 1, system 1 includes control means 4 that are designed to operate vehicle 2 in predefined control mode 15. Control means 4 encompass a central control unit 5 (ECU) of vehicle 2. Depending on the aspect or point of view and depending on the type of predefined, partially autonomous control mode 15, control means 4 are also partially situated outside of vehicle 2, which in the drawing applies to a module 6 of control means 4 that is shown at a distance from vehicle 2. For example, this may be the case when a traffic-guidance system, in which the traffic density is regulated, is implemented by system 1. In a traffic-guidance system of this type it may be expedient to examine not only the environment that is directly detectable by the vehicle, but also to carry out a more global control in an effort to control a timely deceleration when vehicle 2 is approaching a traffic jam in an especially reliable manner.

System 1 includes a plurality of vehicle-related components 7. In the specific embodiment shown here, three vehicle-related components 7 are shown by way of example, in order to sketch the various possible types of vehicle-related components 7. One of vehicle-related components 7 is situated within vehicle 2 and thus represents a vehicle-internal or an on-board device, such as a device for the playback of entertainment media, or a drive recorder. For a better differentiation, this component is denoted by the additional reference numeral 8 in the drawing. Another vehicle-related component 7 is shown outside of vehicle 2 and is located in the closer environment of vehicle 2. This component has been provided with additional reference numeral 9 in the drawing. It may involve, for example, a traffic-infrastructure component such as a traffic sign or a traffic light that is located within the visual range of an environment sensor system of vehicle 2. Other variations are also possible. For example, vehicle-related component 7, 9 may also be another vehicle. Another vehicle-related component 7, which has been additionally provided with reference numeral 10, is shown at a certain distance from vehicle 2. This may be a remote server, for instance, or an autonomous vehicle that is not located within the visual range of ego-vehicle 2.

However, a common aspect of vehicle-related components 7 is that they each have information 11 and/or at least one control command 12 that is relevant for the current, at least partially autonomous operating mode, or control mode 15, of vehicle 2.

Notwithstanding that each exemplarily shown vehicle-related component 7 has a sub-component bearing reference numerals 11 and 12 in the drawing, in reality it is also possible that a vehicle-related component provides only pure information 11 but no control command 12, or vice versa.

This is the case, for instance, when component 7, 9 involves an intelligent traffic sign that simply transmits an item of information 11, which here is a displayed tempo limit, as data that are readable by the vehicle.

According to an aspect of the specific embodiment shown here, the particular information 11 and/or the particular control command 12 of vehicle-related components 7 applies/apply exclusively only to the current at least partially autonomous control mode 15 of vehicle 2; outside the at least partially autonomous control mode 15, other information/control commands apply or other data are transmitted.

This is advantageous, for instance, if system 1 involves an implementation of a traffic-guidance system in which autonomous vehicles are to be detected in order to allow for a greater traffic density for such vehicles. For example, if the predefined at least partially autonomous control mode 15 exists, this makes it possible to provide a different treatment of vehicle 2 or to use a different approach for vehicle 2 than outside the at least partially autonomous control mode 15 or in the case of other vehicles.

In this way, many applications are able to be optimized with regard to an autonomy in the vehicle. For example, autonomously driving vehicles traveling in front and behind are able to be coordinated in a particularly efficient and differentiated manner in a traffic-guidance system and are able to form a vehicle column featuring very low, controlled clearances, a constant data exchange taking place in the process. According to another aspect, e.g., in connection with a parking building, a parking building is able to recognize autonomously driving vehicles and thus in turn make data available to them in the form of electrical information, such as an item of information or a vacant parking slot. In so doing, the machines directly communicate with each other and the respective vehicle passenger is merely informed. According to another example, this time in connection with an exit, vehicle drivers are able to emit a wireless electric signal at the exit from a secondary road or at a garage exit, so that vehicles driving in an automated manner are able to detect vehicle 2 and the situation despite the absence of a visual link, and may take it into account appropriately.

In order to realize these types of aspects, vehicle 2 holds an identification 13 in readiness that is shown within central control unit 5 in the drawing. In addition, system 1 includes communications means 14. Communications means 14 are designed to automatically supply identification 13 to vehicle-related components 7, but only when vehicle 2 is in predefined control mode 15, thereby making the information and/or the at least one control command available to vehicle 2. This makes it possible to signal the at least partially autonomous control mode 15 to vehicle-related components 7, and vehicle-related components 7 are able to respond appropriately in an automatic manner and automatically take vehicle 2 into account.

Additionally, it is also indicated in FIG. 1 that central control unit 5 is connected to communication means 14 and that communication means 14 in vehicle 2 and communications means 14 in vehicle-related component 7 communicate with each other. According to the specific embodiment shown here, communication means 14 are able to communicate with each other both with regard to the providing of identification 13 by vehicle 2 and with regard to making information 11 and/or control commands 12 available, which is shown in the drawing by a double arrow 16 between communication means 14. For reasons of clarity, an explicit illustration of communication means 14 in the other vehicle-related components 8, 9 has been omitted. Furthermore, simply for greater clarity, an explicit illustration of a connection between control unit 5 and motor 3 has been omitted. Communication means 14, for example, may have a vehicle-to-vehicle communications system or a vehicle-to-X communications system.

Identification 13 serves as an autonomous indicator A1, i.e., as a special identification or, in other words, as an "autonomy indicator" or "autonomy status indicator", which signals the at least partially autonomous control mode 15 and reports it to the outside and the inside of vehicle 2 by way of a data transmission.

Vehicle 2 shows a method for operating a vehicle according to a specific embodiment of the present invention. In step S1, a predefined at least partially autonomous control mode is activated inside the vehicle. Depending on the vehicle, this may already be done when starting the vehicle, in particular if the predefined control mode is the predefined control mode of the vehicle, such as in the case of an autonomously driving vehicle. The predefined control mode then corresponds to an autonomous driving mode of the vehicle. On the other hand, according to a development of the specific embodiment, the driver is able to select the predefined control mode during the vehicle operation. In step S2, the vehicle is in the predefined at least partially autonomous control state.

In step S3, an identification that indicates the at least partially autonomous control mode is provided to a vehicle-related component. A wireless electric signal may be output for this purpose. In particular, the outputting may be carried out automatically, under the control of a central control unit, as long as the central control unit maintains the at least partially autonomous control mode. In so doing, the providing, i.e. the transmission of the identification, may take place at a certain repeat frequency or according to a predefined pattern. As a minimum, the identification is transmitted when the vehicle enters the control mode. The predefined pattern may feature temporal or local criteria, in particular. In addition, an especially continuous transmission of the identification is also able to be activated by a driver or by a vehicle passenger. In step S4, the identification is detected by a vehicle-related component, and a receipt may optionally be transmitted to the vehicle.

In step S5, in response to the detection of the identification, an item of information and/or a control command is/are transmitted from the vehicle-related component to the vehicle in order to make the item of information and/or the control command available to the vehicle. In step S6, the vehicle processes the information and/or the control command. Depending on the vehicle-related component, step S5 is skipped, and the item of information and/or the control command instead is/are processed or executed by the vehicle-related component or forwarded to a higher-level system that is related to the predefined at least partially autonomous control mode.

As an expert will recognize, the described specific embodiments are merely exemplary embodiments and only of an illustrative nature; they are not intended to restrict the protective scope of the present invention. Instead, a multitude of variations that are not expressly shown here are possible within the scope of the present invention.

What is claimed is:

1. A method for operating a vehicle, which has a predefined at least partially autonomous control mode, the method comprising:

transmitting, by the vehicle, an identification that indicates the predefined control mode, the identification being transmitted to a vehicle-related component which has at least one of: (i) information relevant for the predefined control mode, and (ii) one or more control command(s) relevant for the predefined control mode; wherein the transmitting takes place only when the vehicle is in the predefined control mode, in order to make the at least one of the information and the control commands available to the vehicle, wherein the vehicle-related component is a device that is remote from the vehicle;

wherein in response to receiving the identification transmitted by the vehicle, the remote device processes and transmits the information and the control commands to the vehicle.

2. The method as recited in claim 1, wherein at least one of: (i) the vehicle makes the identification available to a multitude of vehicle-related components simultaneously, and (ii) when the vehicle is in the predefined control mode, the identification is made available automatically at one of: (a) a predefined repeat frequency, or (b) according to a predefined pattern.

3. The method as recited in claim 1, wherein a plurality of devices that are connected to one another and are situated at a distance from one another are used as vehicle-related components.

4. The method as recited in claim 1, wherein in response to a detection of the identification by the vehicle-related component, the vehicle-related component forwards the identification to a superposed unit via the Internet.

5. The method as recited in claim 1, wherein the vehicle-related component is realized with the aid of memory contents or with the aid of predefined, computer-implemented control methods.

6. The method as recited in claim 1, wherein the same communications channel is used to transmit the identification from the vehicle to the vehicle-related component and to transmit the at least one of the information and the at least one control command, to the vehicle.

7. The method as recited in claim 1, wherein the identification indicates one of: (i) a driver-assistance control mode, (ii) a partially automated control mode, (iii) a highly automated control mode, or (iv) a fully automated control mode, and the vehicle uses as identification a normalized and standardized form, and when leaving the predefined control mode, the vehicle transmits an identification for deactivating the use of the at least one of the information and the at least one control command, to the vehicle-related component.

8. The method as recited in claim 1, wherein the vehicle has a plurality of control modes, and depending on an existing current control mode, provides a correspondingly different identification, and depending on the respective provided identification, at least one of: (i) a correspondingly different information, and (ii) a correspondingly different control command, is made available for the vehicle.

9. The method as recited in claim 1, wherein the identification is provided in one: an electric, optical or acoustic manner.

10. The method as recited in claim 9, wherein the identification is provided in a wireless or a wired manner.

11. A system for operating a vehicle, comprising:
a control unit by which the vehicle is able to be operated in a predefined at least partially autonomous control mode;
a communication device disposed in the vehicle; and
at least one vehicle-related component which has at least one of: (i) information relevant for the predefined control mode, and (ii) one or more control commands relevant for the predefined control mode;
wherein the vehicle-related component is a device that is remote from the vehicle;
wherein the vehicle holds in readiness an identification indicating the predefined control mode, and the communications device transmits the identification to the vehicle-related component automatically only when the vehicle is in the predefined control mode, so that the at least one of the information and the at least one control command is available to the vehicle;
wherein in response to receiving the identification transmitted by the vehicle, the remote device processes and transmits the information and the control commands to the vehicle.

12. The system as recited in claim 11, wherein the communication device includes at least one of a vehicle-to-vehicle communications system and a vehicle-to-X communications system.

13. A vehicle having a central control unit by which the vehicle is able to be operated in an at least partially autonomous control mode, the vehicle and the central control unit being designed to:
transmit an identification that indicates the predefined control mode to a vehicle-related component which has at least one of: (i) information relevant for the predefined control mode, and (ii) one or more control command(s) relevant for the predefined control mode, wherein the vehicle-related component is a device that is remote from the vehicle;
wherein the transmitting takes place only when the vehicle is in the predefined control mode, in order to make the at least one of the information and the control commands available to the vehicle;
wherein in response to receiving the identification transmitted by the vehicle, the remote device processes and transmits the information and the control commands to the vehicle.

* * * * *